UNITED STATES PATENT OFFICE.

HANS M. OLSON, OF LOS ANGELES, CALIFORNIA.

WATERPROOFING COMPOSITION AND METHOD OF MAKING THE SAME.

1,242,585.

Specification of Letters Patent. Patented Oct. 9, 1917.

No Drawing. Application filed June 1, 1916. Serial No. 101,060.

*To all whom it may concern:*

Be it known that I, HANS M. OLSON, a citizen of the United States, residing in Los Angeles, in the county of Los Angeles, State of California, have invented new and useful Waterproofing Compositions and Methods of Making the Same, of which the following is a specification.

My invention relates to compositions of matter, technically called cement and concrete, and plaster structures in which cement is used as a cementing or binding agent, and also other hard plasters prepared for coating the interior or exterior walls of buildings, and its principal object is to provide greater tensile strength, density and toughness in cement, concrete and plaster compositions, by the addition to the cement of a powder which will render it impervious to the action of water.

It is a further object to provide a water proof powder to mix with Portland or other cement.

Heretofore cement concrete and plasters have been formed from the mixture of Portland or other cements, mixed with sand, gravel, stone or other aggregates, in different proportions, to which has been added water until the mixture has been properly incorporated, and then allowed to cure.

The curing process requires an unusual amount of skill on the part of the attendant, as a structure is liable to crack or crumble through being allowed to dry too fast, and does not in any case result in a uniform set of the cement. Also, all concrete and plaster structures are faulty, in that they are porous enough to permit water to pass through, and in damp or rainy weather walls or buildings composed of cement concrete or plaster are always damp and moist. In addition to being unsanitary, the water permeating into the pores of such structures carries substances which in time results in its destruction or oxidation.

My invention overcomes the objections as above described, in that the concrete, or plaster, mixed according to the process and with the ingredients described hereafter, dries slowly and uniformly, acquires its maximum strength in a short time, is dense and non-porous, and has greater toughness and tensile strength.

According to my invention a water proof powder is formed from lime, mineral oil, water and alum. Either lump lime (quick lime) or lime that has been hydrated to a powder, may be used; the process differing only in the essential that more water must be added to hydrate the lump lime. To 50 pounds of the hydrated lime, add 2 gallons of water. The lime is then stirred, or agitated, either by hand or by a mechanical mixer until the water is evenly divided in the mass. 3 gallons of mineral oil is added and the mixture is stirred, or agitated, until the oil is thoroughly incorporated with the lime paste, after which one pound of alum in solution with enough water to dissolve it, is added as a flux. Steam is then turned into the mixer, under a pressure of from 10 to 20 pounds, and the mixture is agitated, or stirred, until all the ingredients are thoroughly mixed, after which the excess moisture is extracted by evaporation and a dry powder formed. The oil used may be any of the forms of mineral oil or liquid hydrocarbon, of the petroleum class, varying from the illuminating oil, or common kerosene, which is used when a white powder is desired, to the common cheap, crude petroleum oil, which is used when high water proofing qualities are desired, and there is no objection to a dark color in the powder. Any of the commercial forms of alum may be used. The alum is used as a flux to unite the oil and lime into a homogeneous mixture, and to improve the quality of the cement composition.

The dry powder thus formed is intimately mixed with cements and plasters by intermixing, or other suitable means, in the grinding, or other suitable means, in the proportion of from one per cent. to twenty per cent., preferably about five per cent., the amount used being governed by the type of work for which the cement or plaster is intended.

The proportions preferred in most cases for the composition are approximately as follows:

Hydrated lime ———————— 50 lbs.
Water ———————————— 2 gals.
Mineral oil ————————— 3 gals.
Alum ————————————— 1 lb.

The proportion of hydrated lime to mineral oil may, however, vary considerably from that above specified, according to the nature of the oil, the purity of the lime, and the conditions under which the composition or the cement or plaster is to be used. Thus I may use as little as thirty pounds of lime, or as much as seventy pounds of lime to each three gallons of mineral oil. The proportions of alum used may be varied, say from one pound to five pounds to each three gallons of mineral oil. The proportion of water used may also be varied according to circumstances.

While I prefer to use the water proofing composition in the form of a powder, as it is more convenient to use and can be more effectively interground with the cement or plaster while in such condition, I may in some cases use the water proofing composition in liquid form, without drying the same.

Cements and concretes water-proofed with this composition are rendered much more effective and valuable for any of the ordinary purposes for which cement concrete is now used, and through its greater tensile strength, adhesiveness and ability to resist the action of water, cement thus water-proofed may be used for many new purposes for which cement as now prepared is unsuited.

The well known plasters, the base of which is gypsum or plaster of Paris, when water-proofed with this composition, are rendered much more impervious to moisture and dampness. As now prepared these plasters disintegrate rapidly on exposure to moisture.

Another important advantage of the concrete, cement, or plaster made with this waterproofing composition as a constituent thereof, is that it is finer grained and smoother, giving a better finish and appearance. Cement or plaster made in this manner also spreads more smoothly and freely. In some cases the cement or plaster made as described will carry more sand or filler than is practicable when the composition is not used.

I am aware that mixtures of hydrated lime and oil have been used in water proofing compounds, a Patent No. 1109540, dated Sept. 1, 1914, having been issued to me for a water proofing composition, consisting of unslaked lime, oil and water, but I am not aware that all the ingredients of the herein described composition have been used together.

What I claim is:

1. A composition for waterproofing cement or plaster, comprising lime, mineral oil and alum.

2. A composition for waterproofing cement or plaster consisting of hydrated lime, a liquid hydrocarbon, and alum, in substantially the proportions stated.

3. A composition for waterproofing cement or plaster, consisting of a powder made from lime, a liquid hydrocarbon and alum.

4. A composition for waterproofing cement or plaster consisting of a powder made from hydrated lime, a liquid hydrocarbon, and alum, in substantially the proportions stated.

5. The method of making a waterproofing composition for cement and plaster which consists in mixing lime with a liquid hydrocarbon and alum, and subjecting such mixture to the action of heat.

6. The method of making a waterproofing composition for cement and plaster which consists in mixing quick lime and water and adding liquid hydrocarbon and alum in such manner that the mixture is subjected to the heat due to hydration of the lime.

7. The method of making a waterproofing composition for cement and plaster, which consists in mixing lime, water, a liquid hydrocarbon and alum, and drying the mixture to form a powder.

In testimony whereof I have hereunto set my hand at Los Angeles, California, this 26th day of May, 1916.

HANS M. OLSON.

Witnesses:
P. S. McNutt,
Mno Pierce.